US012126125B2

(12) United States Patent
Niebauer et al.

(10) Patent No.: US 12,126,125 B2

(45) Date of Patent: Oct. 22, 2024

(54) LOW PASSIVE INTERMODULATION CONNECTOR SYSTEM

(71) Applicant: SPINNER GmbH, Munich (DE)

(72) Inventors: Robert Niebauer, Brannenburg (DE); Wolfgang Zißler, Feldkirchen Westerham (DE); Christoph Neumaier, Baiern (DE)

(73) Assignee: SPINNER GmbH, Munich (DE)

( * ) Notice: Subject to any disclaimer, the term of this patent is extended or adjusted under 35 U.S.C. 154(b) by 0 days.

(21) Appl. No.: 17/592,147

(22) Filed: Feb. 3, 2022

(65) Prior Publication Data

US 2022/0158395 A1 May 19, 2022

Related U.S. Application Data

(63) Continuation of application No. PCT/EP2020/071190, filed on Jul. 28, 2020.

(30) Foreign Application Priority Data

Aug. 12, 2019 (EP) .................................... 19191158

(51) Int. Cl.

*H01R 24/40* (2011.01)
*H01R 13/17* (2006.01)

(Continued)

(52) U.S. Cl.

CPC ............. *H01R 24/40* (2013.01); *H01R 13/17* (2013.01); *H01R 13/629* (2013.01); *H01R 2103/00* (2013.01)

(58) Field of Classification Search

None

See application file for complete search history.

(56) References Cited

U.S. PATENT DOCUMENTS 5,074,809 A 12/1991 Rousseau
5,176,533 A * 1/1993 Sakurai .............. H01R 13/6277
439/352

(Continued)

FOREIGN PATENT DOCUMENTS

CN 104332784 A 2/2015
CN 105684237 A 6/2016

(Continued)

OTHER PUBLICATIONS

PCT International Search Report and Written Opinion, PCT/EP2020/071190, Oct. 5, 2020, 11 pages.

(Continued)

*Primary Examiner* — Oscar C Jimenez

(74) *Attorney, Agent, or Firm* — Quarles & Brady LLP; Yakov S. Sidorin

(57) ABSTRACT

A coaxial RF connector system comprises RF connectors with inner and outer conductors providing a galvanic contact. An outer conductor of a first connector has a plurality of longitudinal slits forming a plurality of spring-loaded contact elements which contact a solid outer conductor of a second connector. The first connector has a centering sleeve which is one monolithic part with the outer conductor for centering the solid outer conductor of the second connector. An insulation sleeve is provided between the centering sleeve and the solid outer conductor. This prevents a galvanic contact and improves PIM.

23 Claims, 3 Drawing Sheets

(51) Int. Cl.
*H01R 13/629* (2006.01)
*H01R 103/00* (2006.01)

(56) References Cited

U.S. PATENT DOCUMENTS

| | | | | |
|---|---|---|---|---|
| 5,195,904 | A * | 3/1993 | Cyvoct .............. | H01R 13/6277 439/349 |
| 5,217,391 | A * | 6/1993 | Fisher, Jr. .............. | H01R 24/44 439/578 |
| 5,466,160 | A * | 11/1995 | Ogura .................... | H01R 24/50 333/260 |
| 6,074,217 | A * | 6/2000 | Maruyama ............. | H01R 24/40 439/63 |
| 6,780,042 | B1 * | 8/2004 | Badescu ............ | H01R 13/6277 439/352 |
| 8,167,636 | B1 * | 5/2012 | Montena .............. | H01R 9/0527 439/95 |
| 9,236,694 | B2 | 1/2016 | Binder et al. | |
| 11,158,984 | B2 * | 10/2021 | Graßl .................... | H01R 13/111 |
| 2009/0280682 | A1 * | 11/2009 | Zhang ...................... | H01R 9/05 439/578 |
| 2009/0284887 | A1 * | 11/2009 | Kauffman ............... | H01P 1/045 361/111 |
| 2011/0130048 | A1 | 6/2011 | Haunberger et al. | |
| 2013/0065415 | A1 * | 3/2013 | Van Swearingen .... | H01R 24/38 439/247 |
| 2014/0322970 | A1 | 10/2014 | Binder et al. | |
| 2015/0229070 | A1 | 8/2015 | Van Swearingen | |
| 2017/0271827 | A1 * | 9/2017 | Qin .......................... | H01R 9/05 |
| 2021/0159632 | A1 * | 5/2021 | Paynter ................ | H01R 25/003 |

FOREIGN PATENT DOCUMENTS

| | | | |
|---|---|---|---|
| CN | 109659779 | A | 4/2019 |
| EP | 3061162 | B1 | 8/2016 |
| EP | 3300535 | B1 | 4/2018 |
| WO | 2015061394 | A1 | 4/2015 |
| WO | 2018024822 | A1 | 2/2018 |

OTHER PUBLICATIONS

First Office Action and Search Report, CN 202080067751.9, Jul. 4, 2020.
Second Office Action, CN 202080067751.9, Sep. 20, 2022.

* cited by examiner

LOW PASSIVE INTERMODULATION CONNECTOR SYSTEM

CROSS-REFERENCE TO RELATED APPLICATIONS

This application is a continuation of pending International Application No. PCT/EP2020/071190 filed on Jul. 28, 2020, which designates the United States and claims priority from European Application No. 19191158.5 filed on 12 Aug. 2019. The disclosure of each of the above-identified patent applications is incorporated herein by reference.

RELATED ART

1. Field of the Invention

The invention relates to a coaxial connector for radio frequencies (RF) which may be a miniature connector. The connector has an outer conductor interface and housing optimized for low passive intermodulation (PIM).

2. Description of Related Art

EP 3 061 162 B1 discloses a coaxial connector with capacitive coupling. This connector has dielectric coated surfaces between the connectors and does not provide a galvanic contact and cannot provide a good grounding.

US 2015/0229070 A1 discloses a coaxial connector with dielectric coated surfaces between the connectors, which not provide a galvanic contact and cannot provide a good grounding U.S. Pat. No. 9,236,694 B2 discloses a coaxial connector system designed for low passive intermodulation. A plug connector has a spring-loaded outer connector for contacting the solid side wall of a socket connector. Due to a precision contact design and high contacting forces between the plug connector and the second connector, a low passive intermodulation is achieved.

SUMMARY

The embodiments are providing a coaxial RF connector with improved passive intermodulation characteristics. The RF connector is configured to be usable for multi-connector assemblies, where a large number of connectors are used. In addition, the connector should have such a shielding that it may be used within a radiation field of an antenna.

In an embodiment, a coaxial RF connector system includes a coaxial RF connector and a coaxial RF counter connector matching to the coaxial RF connector. The RF connector system provides a galvanic contact when the coaxial RF connector is mated to the coaxial RF counter connector. Such a connector provides good shielding and grounding and may be used in a broad range of frequencies starting from DC. Therefore, the respective inner conductors of the RF connector and RF counter connector form galvanic contact and, further, the respective outer conductors of these two connectors form galvanic contact. The inner conductors are insulated from the outer conductors.

A coaxial RF connector (which may be a plug connector, a socket connector, or a hermaphroditic connector) has a housing, an inner conductor (referred to interchangeably as a first inner conductor), and an outer conductor (referred to interchangeably as a second first outer conductor). The first inner conductor defines by its center a center axis of the connector. The first outer conductor may be arranged coaxially around the center or inner conductor and may hold the center conductor by at least one strut including electrical insulation material or an insulation layer. A housing for the RF connector may be structured as a part of the first outer conductor. There may be at least one means for mechanically fastening a plug connector to a socket connector or two hermaphroditic connectors together.

Implementations of \the invention work substantially with any type of the first inner conductor and first outer conductor, provided that the first outer conductor of the RF connector and the outer conductor of the RF counter connector (interchangeably referred to as a second outer conductor) are in contact and preferably in galvanic contact with each other when mated.

The coaxial RF connector includes a first centering device which may be at the first outer conductor. In a specific implementation, this centering device may be part of the first outer conductor or attached thereto. The first centering device may have an outer contour coaxial to the first inner conductor. Such outer contour may be cylindrical and may have a circular cross section or be conical. The outer contour of the first centering device may also have another suitable shape such as a protrusion with a squared or hex cross section, depending on the specific implementation.

In an embodiment, there may be multiple inner and outer conductors within a common centering device.

The coaxial RF counter connector includes a second centering device which may be at the second outer conductor of the coaxial RF counter connector. Such centering device may be part of the second outer conductor or attached thereto. The second centering device may have a corresponding outer contour coaxial to the inner conductor of the coaxial RF counter connector (which is interchangeably referred to as a second inner conductor). This outer contour may be cylindrical and may have a circular cross section or be conical. It may also have any other suitable shape such as a protrusion with a squared or hex cross section, depending on the specific implementation.

The shapes of the centering devices are judiciously adapted to each other such that the first centering device matches into or on the second centering device when the connectors are mated. In the case of cylindrical contours, the first centering device may have an outer diameter smaller than the inner diameter of the second centering device. Alternatively, the first centering device may have an outer diameter larger than the inner diameter of the second centering device.

A large number of tests have shown that even if a given RF connector provides a good low-PIM outer conductor connection, RF currents may flow through other paths such as connector housing parts or centering parts of the connectors. If these other parts only provide a marginal electrical connection that may not be quite sufficient for practical purposes, this may lead to an increase of PIM. This problem is often solved, at least partially, by providing high locking forces between the connectors, such that there is a good contact between the housing parts. Such solution still does not necessarily guarantee a perfect electrical connection between the housing parts. A major problem arises in multi-connector assemblies, which, for example, may be used to connect antenna panels. Here, it is difficult to achieve high contact forces at all components of the connectors.

The embodiments are based on the concept of avoiding RF currents flowing through housing parts or other parts by electrically insulating these parts. If there is only a capacitive connection between given parts, a small current may still flow, but no intermodulation is generated. Therefore, a very low PIM may be achieved as a result of implementation of the proposed embodiments.

To ensure that there exist no significant further currents from the outer conductors that are flowing through alternate paths (which currents may increase PIM), and according to the idea of the invention, the first centering device is electrically (galvanically) insulated from the second centering device. There may remain only some capacitive coupling. There may be an insulating (dielectric) material, which may be a polymer such as PTFE (Polytetrafluorethylene, Teflon), PE (Polyethylene), Polyimide (Kapton) or an oxide or anodized layer or any other suitable material between the centering devices.

In a given embodiment, there may be employed a narrow gap between the centering devices when the connectors are mated. The gap—which may include the insulating material—may have a thickness between 0.1 mm and 10 mm, between 0.3 mm and 3 mm, or between 0.5 mm and 1 mm, depending on a particular implementation. Alternatively or in addition, there may be employed an overlap between the centering devices (dimensioned substantially as the depth of the gap—which may be between 3 mm and 50 mm or between 5 mm and 20 mm or between 7 mm and 15 mm, depending on the specific implementation). A narrower and deeper gap may result in a better shielding.

In an embodiment, the first centering device may be electrically insulated from the RF connector outer conductor (the first outer conductor), and/or the second centering device may be electrically insulated from the RF counter connector outer conductor (the second outer conductor). Here, at least one of the centering devices may include an electrically insulating material. At least one of the centering devices may also be entirely made of such an insulating material, in a specific case.

In a related embodiment, an insulating sleeve may be included between the first centering device and the second centering device. Here, the sizes or diameters of the centering devices have to be adapted accordingly, such that the insulating sleeve fits in between these centering devices. The insulating sleeve may be attached to or be part of either one or both of the centering devices.

All discussed embodiments relate to connectors and a connector system providing galvanic contact, such that a low ohmic resistance for DC is established between the inner conductors of mated connectors and between outer conductors of mated connectors. Further mechanical parts—such as centering devices, for example—are insulated to prevent any DC current from flowing through other paths than the outer conductor contacts and the inner conductor contacts.

Accordingly, the coaxial RF connector outer conductor may include a first contact section having a corresponding bare metal surface and the coaxial RF counter connector outer conductor may include a second contact section having a corresponding bare metal surface, with the first and second contact sections forming a galvanic contact when the coaxial RF connector and the coaxial RF counter connector are mated. Further, the coaxial RF connector inner conductor includes a third contact section having a corresponding bare metal surface and the coaxial RF counter connector inner conductor includes a fourth contact section having a corresponding bare metal surface, with the third and fourth contact sections forming a galvanic contact when the coaxial RF connector and the coaxial RF counter connector are mated.

In one embodiment, the outer conductor of a coaxial RF connector is a first centering device and has a cylindrical outer contour coaxial to the corresponding inner conductor. The coaxial RF counter connector may include a centering sleeve having a cylindrical inner contour coaxial to the corresponding inner conductor. Furthermore, an insulating sleeve may be provided between the outer conductor, and the centering sleeve. The outer conductor of the coaxial RF connector may have an outer diameter smaller or larger than the inner diameter of the centering sleeve and the outer conductor fits into or on the centering sleeve together with the insulating sleeve. The insulating sleeve may include any insulating material as mentioned above. Such capacitively coupled centering devices may provide an improved shielding due to the additional conductive structure around the outer conductor. Furthermore, such embodiments may be used in the radiation field of antennas, as the connector does not generate intermodulation from signals coupled from the outside to the connector.

The centering sleeve may be one single, monolithic part with the outer conductor of the RF counter connector. Such counter connector outer conductor may have a tubular shape with a plurality of longitudinal slits as described in more detail above.

In one related non-exclusive embodiment, the outer conductor of a coaxial RF connector may have a tubular shape without or with a plurality of slits in a longitudinal direction parallel to the center axis. The slits may have a length in a range between 1- to 5-times the diameter of such outer conductor. The slits may extend to an end or an end face of the outer conductor. This end may be oriented to a contact side of the connector. A counter connector may be connected at the contact side for making an electrical connection. There may be any number of slits between 2 and 50, preferably between 4 and 8. The outer conductor together with the slits may include a plurality of protrusions at their ends which may form a plurality of spring-loaded contact elements. These contact elements may produce a counterforce if a force is applied in a radial direction with respect to the center axis.

The RF counter connector may include a counter connector inner conductor defining a center axis of the connector, and counter connector outer conductor which is arranged coaxially to the counter connector inner conductor. Preferably, the counter connector outer conductor has a tubular shape without or with slits as mentioned above. If the RF connector has an outer conductor with slits, the RF counter connector may have an outer conductor without slits and vice versa. The RF counter connector outer conductor may have a counter connector outer conductor end face. The counter connector outer conductor end face may have a circular outer contour and a size adapted to match to the RF connector outer conductor. To improve PIM performance, there may be a gap between the outer conductor of the coaxial connector and the counter connector outer conductor end face in an axial direction when both connectors are mated. There may be only a single electrical current path from the coaxial connector outer conductor via the spring-loaded contact elements into the mating conductor.

In an embodiment, a coaxial RF counter connector includes at least a counter connector inner conductor (the second inner conductor), a counter connector outer conductor coaxial to the counter connector inner conductor, and a centering sleeve. The centering sleeve may have a cylindrical inner surface with an inner contour coaxial to the inner conductor. An insulating sleeve including electrically insulation material may be included at the cylindrical inner surface of the centering sleeve. In another embodiment, the centering sleeve may have a cylindrical outer surface with an outer contour. An insulating sleeve including electrically insulation material may be included at the cylindrical outer surface of the centering sleeve.

In an embodiment, the counter connector outer conductor has an end face, and the insulating sleeve may cover a section of the centering sleeve in a radial direction from the end face.

In a further embodiment any one or both connectors may be embedded into a housing or into housing parts.

A multi-connector assembly may include a plurality of coaxial RF counter connectors and/or coaxial RF connectors—any type is further referred to as connector, for simplicity.

To ensure a proper electrical contact, it may be desired to hold a connector in a fixed position relative to the counter connector, to which the connector should be coupled or mated to transfer electrical signals or power. The connector may be held by a connector housing which may include further attachment components or by a larger unit, for example a transmitter housing into which the connector is integrated. At least one connector may be held flexible in a housing or parts thereof. At least one coaxial RF connector may be held flexible in a first housing component whereas at least one coaxial RF counter connector may be fixed in a second housing component. A precise alignment of the connectors is achieved by the centering sleeves.

In an embodiment, the coaxial connector includes a locking sleeve forming a quick-lock mechanism which may be coaxial to the outer conductor.

In a further embodiment, the coaxial RF connector may include a locking nut which may be held by the housing or the outer conductor. The locking nut may have an inner thread which may engage with an outer thread of a counter connector, such that the connector may be locked to the counter connector by rotating the nut and engaging the threads.

In a further embodiment, the RF counter connector may include a locking thread which may match to a locking nut of the coaxial RF connector as described above.

In an embodiment, the coaxial RF connector is a plug connector, and it includes a contact pin at the inner conductor. The outer conductor may be a sleeve without slits.

In a further embodiment, the coaxial RF counter connector may be a socket connector and includes a counter connector inner conductor contact socket which is at the end of the counter connector inner conductor and mates with the inner conductor contact pin.

In another embodiment, the centering device may include at least one and preferably two pins mechanically connected to one of the connectors and at least one corresponding bush, mechanically connected to the other of the connectors, into which the at least one pin fits. The pin may be an elongated piece of material, e.g., a small rod, which may have a cylindrical shape and which may have a tapered tip to simplify insertion into the bush. The bush may be a tubular structure providing an opening to insert the pin. The pin may match closely into the bush. The pin and/or the bush may be mounted outside of the outer conductor of the respective connector. The length of the pin may be selected such, that the pin is guided by the bush at a distance of the connectors, where the connectors do not touch each other. The pin and/or the bush may include electrical insulation material, such that no galvanic (conductive) connection may be provided between the pin and/or the bush. The pin and/or the bush may be made of insulating material or have a coating thereof. In an embodiment, the pin is of metal and the bush is of insulating material. There may be one pin at each connector and a bush matching to the pin of the opposing connector.

In general, the plug and socket configuration may be reversed, or a hermaphroditic connector configuration may be used for the inner conductor. This has no or only a negligible influence on the outer conductor configuration disclosed herein.

In an embodiment, a coaxial RF connector is a connector for electrically connecting RF lines and for coupling radio frequency (RF) signals. An outer conductor is arranged coaxially around an inner conductor. For coupling such RF signals, the connector must have a predetermined characteristic impedance which may be 50 Ohm. The connector must also have low insertion losses and low return losses. This requires beyond a high conductivity, a coaxial RF connector to have a conductor structure which maintains the characteristic impedance over the full length of the connector with minimal deviations. This means that essentially the capacitance must be constant over the full length of the connector. Therefore, at each point of the conductor structure, a certain relation between the diameter of the inner conductor and the distance between outer conductor and inner conductor must be maintained. Here, also the dielectric constant of a material between the inner conductor and the outer conductor must be considered.

Coaxial HV (high voltage) connectors are in most cases not suitable for RF signals. Such HV connectors provide a symmetrical, coaxial structure to maintain an even field distribution, but it is not essential to have a certain characteristic impedance and further to maintain such a characteristic impedance constant over the full length of the connector. Therefore, the design of HV connectors is less critical.

BRIEF DESCRIPTION OF THE DRAWINGS

In the following, the invention will be described by way of example, without limitation of the general inventive concept, on examples of embodiment and with reference to the drawings.

Figure 1:
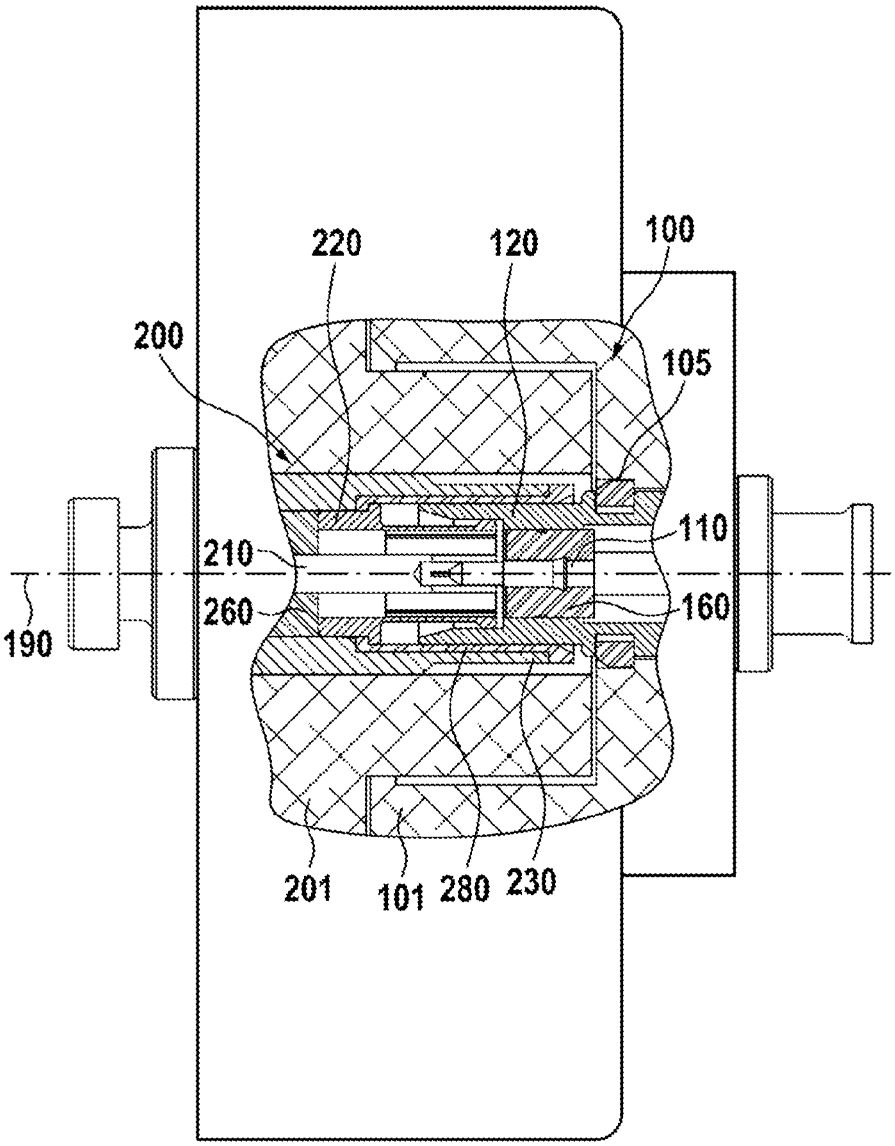
FIG. 1 shows a first embodiment of a connector system.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

In FIG. 1, a first embodiment of a coaxial RF connector system is shown in a mated state. A coaxial RF connector 100 may be held by elastic means 105 which may be a rubber ring in a first body 101 and a coaxial RF counter connector 200 may be held in a second body 201. The coaxial RF connector 100 has an inner conductor 110 arranged coaxially with respect to an outer conductor 120. The inner conductor 110 defines a center axis 190 and may be supported from the outer conductor 120 by a strut 160 preferably including an electrically insulating material (dielectric). The outer conductor 120 may have a cylindrical outer contour coaxial to the inner conductor 110 and thereby may form a first centering device 170.

The coaxial RF counter connector 200 has an inner conductor 210 arranged coaxially with respect to an outer conductor 220 and supported by a strut 260 that preferably includes an electrically insulating material (dielectric). Furthermore, a centering sleeve 230 is provided. In this embodiment, the centering sleeve 230 is part of a coaxial conductor system together with the inner conductor 210. The centering sleeve 230 may be configured to hold the coaxial RF counter connector outer conductor. The centering sleeve 230 may have a cylindrical inner contour with circular cross section coaxial to the inner conductor 210 of the coaxial RF counter connector 200. At the inner contour of the centering sleeve 230 there is an electrically insulating material (dielectric material) 280, as shown. The insulating material may include a polymer such as PTFE (Polytetrafluorethylene, Teflon), PE (Polyethylene), Polyimide (Kapton) or an oxide or anodized layer or any other suitable material. The dielectric material may have the shape of a sleeve which may be inserted into the centering sleeve.

Figure 4:
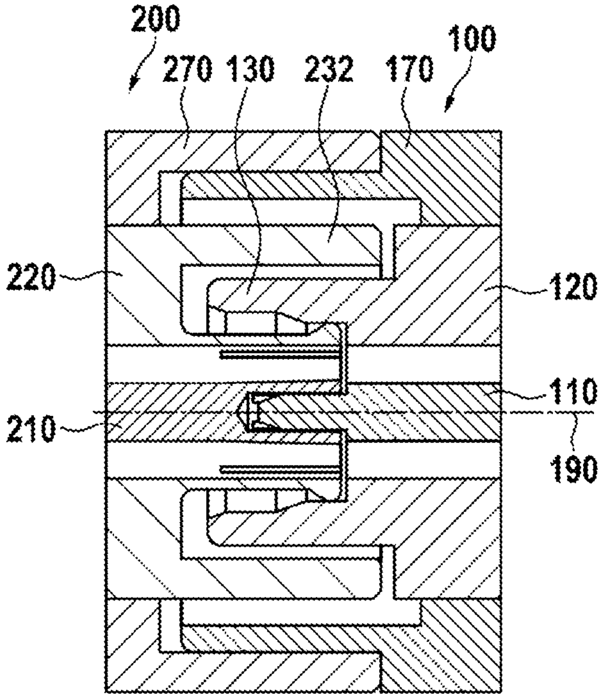
FIG. 4 shows another embodiment of a connector system.

In reference to FIG. 4, illustrating the presence of centering devices in an embodiment, first centering device 170 is shown to have an outer size smaller than the inner size of the second centering device 270, including the thickness of the dielectric material, such that the first centering device 170 matches into the second centering device 270. The matching centering devices allow for a good centering of the connectors. The dielectric material between the centering devices prevents a galvanic contact between the centering devices such that no intermodulation can take place.

Figure 2:
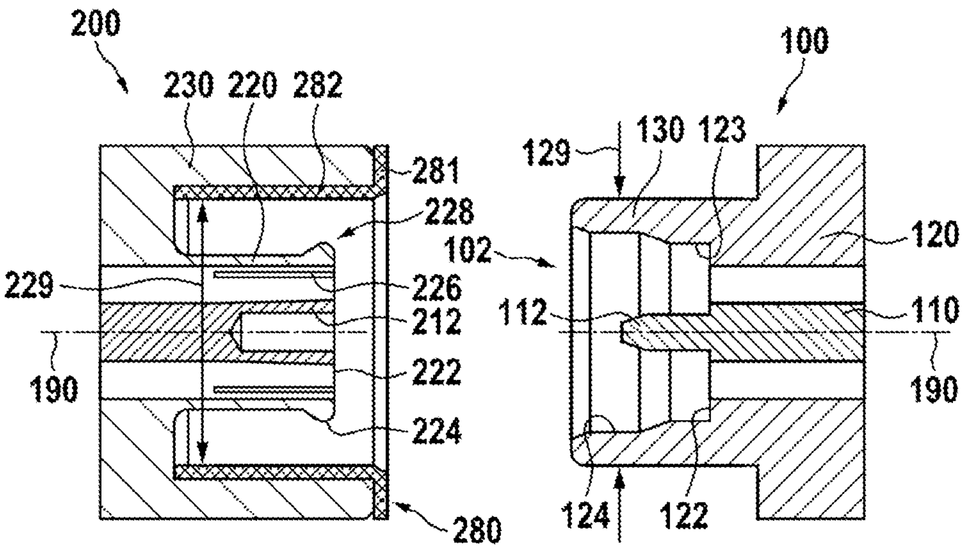
FIG. 2 is a simplified drawing of a connector and a counter connector.

In FIG. 2, a simplified drawing of separated from one another connector 100 and counter connector 200 (similar to those illustrated in FIG. 1) is shown. The inner conductor may be part of a male coaxial RF connector and therefore may have a contact pin 112, which may include a contact section having a bare metal surface and extending towards a contact side 102 from which a coaxial RF counter connector may be attached. The outer conductor may have a contact section 123*m* which may have a bare metal surface and where it is contacted by the counter connector. At the end of the contact section 123 is an outer conductor end face 122. An at least partially conically shaped insertion section 124 may be provided, which simplifies insertion of a counter connector.

The counter connector 200 may have an outer conductor with a plurality of longitudinal slits 226 extending from the outer conductor end face. The material of the outer conductor remaining between these slits may be configured as spring-loaded contact elements 228, which may produce a contact force in a radial direction with respect to the center axis 190. At the end of the spring-loaded contact elements 228 and aligned with an outer conductor end face 222 there may be formed contact element protrusions 224 for contacting the outer conductor of the coaxial RF connector 100 at the contact section 123. The contact element protrusions 224 may include a contact section having a bare metal surface. This results in a well-defined high contact force between the connectors, which reduces intermodulation. The counter connector inner conductor 210 may have a female contact socket 212, which may include a contact section having a bare metal surface adapted to match the inner conductor contact pin 112.

In this embodiment, the counter connector 200 may have a centering sleeve 230, which may be configured as one monolithic part with the counter connector outer conductor 220. A dielectric sleeve 280 may be inserted into the centering sleeve 230. The dielectric sleeve 280 may include a cylindrical (with circular cross section) section 282 which may include radially arranged dielectric material, and a disc shaped section 281 which may include radially arranged dielectric material. The inner size or diameter of the counter connector centering sleeve 230 including the dielectric sleeve 280 (which is marked by reference number 229) is larger than or equal to the outer size or diameter 129 of the coaxial connector outer conductor 120.

Figure 3:
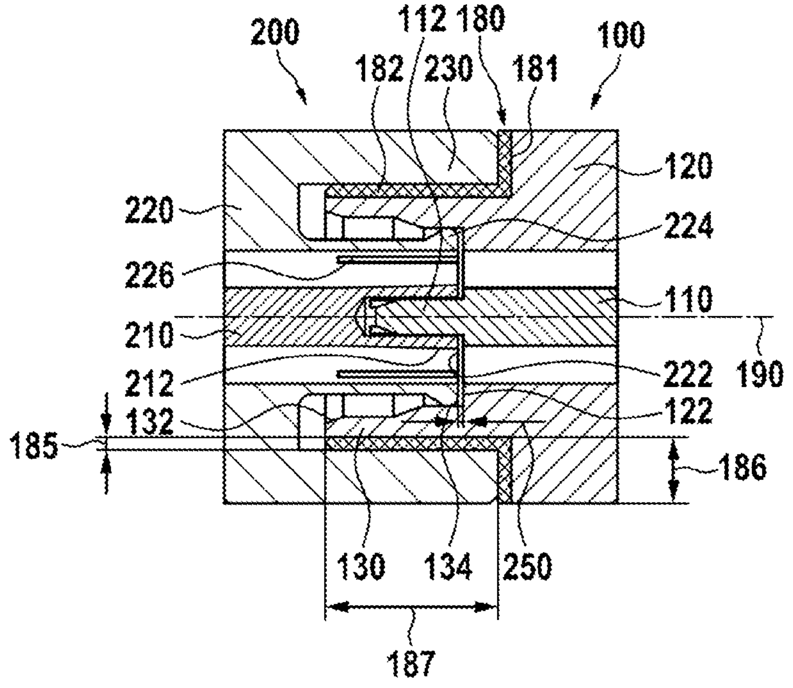
FIG. 3 illustrates a further embodiment of a connector system.

In FIG. 3, a related embodiment of a simplified coaxial RF connector system is shown. Here, a dielectric sleeve 180 may be held by the coaxial RF connector 100. The dielectric sleeve 180 having a thickness 185 may include a cylindrical (with a circular cross section) section 182 having a second length 187 (which section may include radially arranged dielectric material), and a disc shaped section 181 having a first length 186 (which disk may include radially arranged dielectric material). In a mated state between the RF connector 100 and the RF counter connector 200, as shown, the dielectric sleeve 180 may form a gap having essentially a depth corresponding to the sleeve thickness 185 between the outer conductor 120 of the coaxial RF connector 100 and the centering sleeve 230 of the coaxial RF counter connector 200. In a mated state, as shown, there may be a gap 250 between the outer conductor end face 122 the coaxial RF connector 100 and the outer conductor end face 222 of the coaxial RF counter connector 200. The presence of this gap prevents an at least partially undefined galvanic contact besides the well-defined galvanic contact between the contact element protrusions 224 and the contact section 123. Such configuration further improves PIM.

In FIG. 4, another embodiment of a coaxial RF connector system is shown. Here, an outer sleeve 232 is provided at the counter connector outer conductor 220, which may even be one monolithic part with the outer conductor. In this embodiment, the outer sleeve 232 has no centering function, but may provide some shielding. Instead, a separate second centering device 270, which may include electrically insulating (dielectric) material may be provided at the coaxial RF counter connector 200. Further, a first centering device 170 may be provided at the coaxial RF connector 100. Again, the first centering device 170 may have an outer size smaller than the inner size of the second centering device 270 or the first centering device 170 may have an outer size larger than the inner size of the second centering device 270, such that the first centering device 170 matches into the second centering device 270.

In an embodiment, at least one of the first centering device 170 and the second centering device 270 includes electrically insulating (dielectric) material, such that there is no galvanic connection between the connectors over the centering devices. In that case, a dielectric sleeve is not needed.

Figure 5:
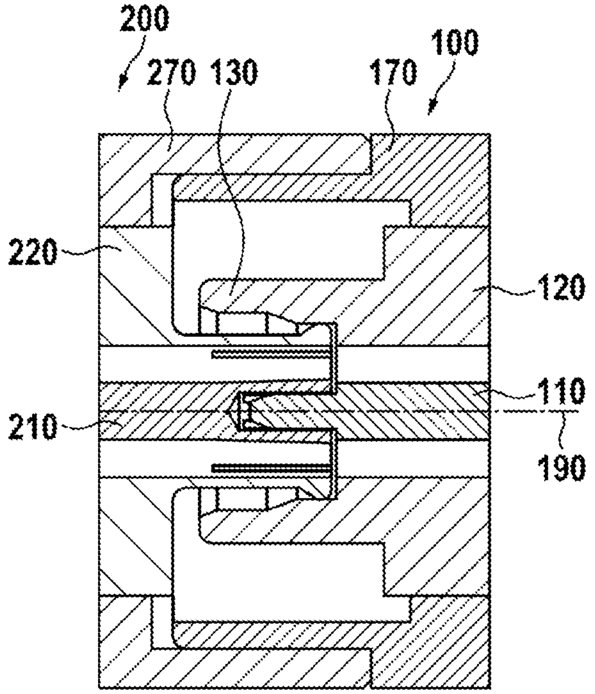
FIG. 5 shows another embodiment of a connector system.

In FIG. 5, another related embodiment of a coaxial RF connector system is shown. This embodiment is similar to the previous embodiment of FIG. 4, but there is no outer sleeve.

It will be appreciated to those skilled in the art having the benefit of this disclosure that this invention is believed to provide a RF connector system. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

100 coaxial RF connector
101 first body
102 contact side
105 elastic connector holding means
110 inner conductor
112 inner conductor contact pin
120 outer conductor
122 outer conductor end face
123 contact section
124 insertion section
129 outer diameter
130 contact sleeve
160 strut
170 first centering device
180 dielectric material
181 disc shaped dielectric material
182 cylindrical dielectric material
185 thickness of sleeve
186 first length of sleeve
187 second length of sleeve
190 center axis
200 coaxial RF counter connector
201 second body
210 counter connector inner conductor
212 counter connector inner conductor contact socket
220 counter connector outer conductor
222 outer conductor end face
224 contact element protrusion
226 longitudinal slit
228 spring loaded contact element
229 inner diameter
230 centering sleeve
232 outer sleeve
250 gap
260 strut
270 second centering device
280 dielectric sleeve of counter connector
281 disc shaped dielectric material
282 cylindrical dielectric material

The invention claimed is:

1. A coaxial RF connector system comprising:
a coaxial RF connector and a coaxial RF counter connector,
the coaxial RF connector comprising at least
a first inner conductor defining a center axis of the coaxial RF connector,
a single first outer conductor coaxial with the first inner conductor, and
a first centering device located radially farther away from the center axis than the single first outer conductor, the first centering device having an outer surface coaxial with the first inner conductor,
the coaxial RF counter connector comprising at least
a second inner conductor,
a second outer conductor coaxial with the second inner conductor, and
a second centering device having an inner surface that is separated from an outer surface of the second outer conductor by a gap, said inner surface being coaxial with the second inner conductor,
wherein, when mated, the first inner conductor and the second inner conductor provide an inner galvanic contact with each other,
wherein, when mated, the single first outer conductor and the second outer conductor provide an outer galvanic contact with each other,
wherein:
(16*a*) the outer surface of the first centering device conforms to a shape and size of the inner surface of the second centering device such that, when mated, the first centering device matches the second centering device;
and
wherein:
(i) the first centering device is electrically insulated from the single first outer conductor, and/or
the second centering device is electrically insulated from the second outer conductor,
or
(ii) either an insulating sleeve or an insulating layer is included between the first centering device and the second centering device to insulate the first centering device from the second centering device, said insulating sleeve dimensioned to separate both (ii-1) corresponding first surfaces of the first and second centering devices that are mating and coaxial with one another and (ii-2) corresponding second surfaces of the first and second centering devices that are mating and transverse to the center axis.

2. A coaxial RF connector system according to claim 1, wherein:
the first outer conductor comprises a first contact section having a bare metal surface and the second outer conductor comprises a second contact section having a bare metal surface,
wherein the first and second contact sections are in galvanic contact when the coaxial RF connector and the coaxial RF counter connector are mated, and
the first inner conductor comprises a third contact section having a bare metal surface and the second inner conductor comprises a fourth contact section having a bare metal surface,
wherein the third and fourth contact sections are in galvanic contact when the coaxial RF connector and the coaxial RF counter connector are mated.

3. A coaxial RF connector system according to claim 1, wherein the first outer conductor is the first centering device.

4. A coaxial RF connector system according to claim 3, wherein the second centering device is a centering sleeve.

5. A coaxial RF connector system according to claim 4, wherein the centering sleeve forms one monolithic part with the second outer conductor.

6. A coaxial RF connector system according to claim 1, wherein the second outer conductor is a single second outer conductor and wherein the second centering device forms one monolithic part with said second outer conductor.

7. A coaxial RF connector system according to claim 1, wherein at least one of the first centering device and the second centering device comprises an electrically insulating material or an insulating layer.

8. A coaxial RF connector system according to claim 1, wherein the outer contour of the first centering device is a cylindrical contour, and the inner contour of the second centering device is a cylindrical contour, and the first centering device has an outer diameter that is smaller or larger than an inner diameter of the second centering device.

9. A coaxial RF connector system according to claim 1, wherein the second outer conductor has a tubular shape with a plurality of longitudinal slits, said slits extending to an end face of the second outer conductor and forming a plurality of spring-loaded contact elements.

10. A coaxial RF connector system according to claim 9, wherein when the coaxial RF connector and the coaxial RF counter connector are mated with one another, an end face of the first outer conductor and an end face of the second outer conductor form a gap therebetween.

11. A coaxial RF connector system according to claim 1, wherein the coaxial RF connector or the coaxial RF counter connector further comprises a locking nut or a locking sleeve.

12. A coaxial RF connector system according to claim 11, wherein the coaxial RF connector is a socket connector and comprises an inner conductor contact socket, and wherein the coaxial RF counter connector is a plug connector and comprises a counter connector inner conductor contact plug.

13. A coaxial RF connector system according to claim 11, wherein the coaxial RF connector is a plug connector and comprises an inner conductor contact pin, and wherein the coaxial RF counter connector is a socket connector and comprises a counter connector inner conductor contact socket.

14. A coaxial RF connector system according to claim 1, wherein the coaxial RF connector is a plug connector and comprises an inner conductor contact pin, and wherein the coaxial RF counter connector is a socket connector and comprises a counter connector inner conductor contact socket.

15. A coaxial RF connector system according to claim 1, wherein the coaxial RF connector is a socket connector and comprises an inner conductor contact socket, and wherein the coaxial RF counter connector is a plug connector and comprises a counter connector inner conductor contact plug.

16. A coaxial RF connector system according to claim 1, wherein when the coaxial RF connector and the coaxial RF counter connector are mated with one another, a gap exists between an end face of the first outer conductor and an end face of the second outer conductor.

17. A coaxial RF connector system according to claim 1, wherein the second centering device forms one monolithic part with the second outer conductor.

18. A coaxial RF connector system according to claim 1, wherein:

the outer surface of the first centering device conforms to a shape and size of the inner surface of the second centering device such that, when mated, the first centering device matches the second centering device in contact therewith at the outer surface of the first centering device along the center axis;

or an inner surface of the first centering device conforms to a shape and size of an outer surface of the second centering device such that, when mated, the first centering device matches the second centering device in contact therewith at the inner surface of the first centering device along the center axis.

19. A coaxial RF connector system according to claim 1, wherein the second centering device is located radially farther away from an axis of the coaxial RF counter connector than the second outer conductor.

20. A coaxial RF counter connector, comprising at least a counter connector inner conductor that includes a first contact section having a first bare metal surface, a single counter connector outer conductor, which comprises a second contact section having a second bare metal surface, the single counter connector outer conductor being arranged coaxially with the counter connector inner conductor, and a centering sleeve having an annular edge surface transverse to an axis of the coaxial RF counter connector and a) a cylindrical inner surface that has an inner contour coaxial with the counter connector inner conductor, or b) a cylindrical outer surface having an outer contour coaxial with the counter connector inner conductor, wherein:

when the centering sleeve includes the cylindrical inner surface, such cylindrical inner surface contains an insulating sleeve comprising an electrically insulating material or layer, said insulating sleeve dimensioned to separate both (1) corresponding first surfaces of the first and second centering devices that are mating and coaxial with one another and (2) corresponding second surfaces of the first and second centering devices that are mating and transverse to the center axis.

21. A coaxial RF counter connector according to claim 20, wherein the counter connector outer conductor has an end face and the insulating sleeve covers a section of the centering sleeve in a radial direction from the end face.

22. A coaxial RF connector system comprising:

a coaxial RF connector and a coaxial RF counter connector, the coaxial RF connector comprising at least a first inner conductor defining a center axis of the coaxial RF connector, a single first outer conductor coaxial with the first inner conductor, and a first centering device located radially farther away from the center axis than the single first outer conductor, the first centering device having an outer surface coaxial with the first inner conductor, the coaxial RF counter connector comprising at least a second inner conductor, a second outer conductor coaxial with the second inner conductor, and a second centering device having an inner surface that is separated from an outer surface of the second outer conductor by a gap, said inner surface being coaxial with the second inner conductor, wherein, when mated, the first inner conductor and the second inner conductor provide an inner galvanic contact with each other, wherein, when mated, the single first outer conductor and the second outer conductor provide an outer galvanic contact with each other, wherein:

(39*a*) the outer surface of the first centering device conforms to a shape and size of the inner surface of the second centering device such that, when mated, the first centering device matches the second centering device; of (39*b*) an inner surface of the first centering device conforms to a shape and size of an outer surface of the second centering device such that, when mated, the first centering device matches the second centering device;

and wherein:

either an insulating sleeve or an insulating layer is included between the first centering device and the second centering device to insulate the first centering device from the second centering device, said insulating sleeve dimensioned to separate both (ii-1) corresponding first surfaces of the first and second centering devices that are mating and coaxial with one another and (ii-2) corresponding second surfaces of the first and second centering devices that are mating and transverse to the center axis.

23. A coaxial RF connector system according to claim 22, wherein the first outer conductor is the first centering device or the second centering device is a centering sleeve.

* * * * *